United States Patent Office 3,275,620
Patented Sept. 27, 1966

3,275,620
NOVEL 18,20β-DIOXYGENATED-5β-PREGNANES
Georges Muller, Nogent-sur-Marne, France, assignor, by mesne assignments, to Roussel-UCLAF, S.A., Paris, France, a corporation of France
No Drawing. Filed June 27, 1960, Ser. No. 38,723
Claims priority, application France, June 29, 1959, 798,790
1 Claim. (Cl. 260—239.55)

The invention relates to novel 18,20-dioxygenated steroids. It relates especially to 18,20β-dioxygenated 5β-pregnanes, of the formula:

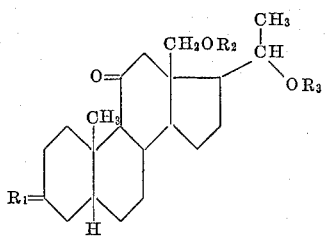

wherein $R_1$ is a member selected from the group consisting of

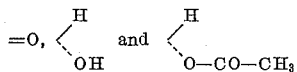

and $R_2$ and $R_3$ are members selected from the group consisting of H and —CO—CH$_3$, and more particularly to 5β-pregnane-3α,18,20β-triol-11-one,
3α,18,20β-triacetoxy-5β-pregnane-11-one,
5β-pregnane-18,20β-diol-3,11-dione, and
18,20β-diacetoxy-5β-pregnane-3,11-dione.

Jeger et al. (Helv. Chem. Acta, 1959, Vol. 42, page 1124) has recently described an attack on the $C_{18}$ position by an oxygenated function in the $C_{20}\beta$ position activated by lead tetraacetate. By this method, an ether function between the $C_{18}$ position and the $C_{20}\beta$ position was obtained, the opening of the oxygenated bridge being thereafter achieved in the following stage of the synthesis. The reactions made up to this time involved the use of starting materials of extremely simple structure only, which compounds have been devoid of substituted functional groups. It would be impossible to predict what the results would be starting with the steroids intermediate in the synthesis of cortisone compounds and especially those having a ketone functions in the $C_{11}$ position as well as the natural orientation in $C_5$ position (5β).

It is an object of this invention to obtain 18,20β-dioxygenated-5β-pregnanes of the formula

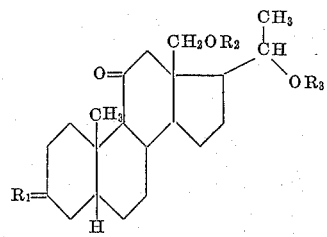

wherein $R_1$ is a member selected from the group consisting of

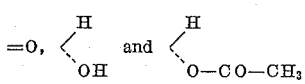

and $R_2$ and $R_3$ are members selected from the group consisting of H and —CO—CH$_3$.

It is a further object of this invention to develop a process of producing novel 18,20β-dioxygenated-5β-pregnanes.

A still further object of this invention is the production of the intermediate 18,20β-oxido-5β-pregnane-3,11-dione.

These and other objects of this invention will become more apparent as the description thereof proceeds.

I have found that the classic methods of opening the etheric analogs of tetrahydrofuran and more particularly the method of using zinc chloride in acetic acid anhydride, can be used to produce 18,20β-dioxygenated-5β-pregnanes of the formula

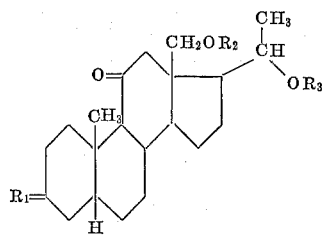

where $R_1$, $R_2$ and $R_3$ have the values assigned above starting with 18,20β-oxido-5β-pregnane-3α-ol-11-one and its acetate. These starting materials for the invention may be prepared by oxidizing the 3-monoacetate of 5β-pregnane-3α,20β-diol-11-one by lead tetraacetate while heating to reflux in benzene, pouring the reaction mixture in an aqueous solution of sodium iodide, adding to the mixture sodium hyposulfite until the mixture is decolorized, isolating the raw oxidation product and purifying this last by chromatography on alumina. The 3α-acetoxy-18,20β-oxido-5β-pregnane-11-one thus obtained is then saponified into 18,20β-oxido-5β-pregnane - 3α-ol-11-one by alcoholic sodium hydroxide.

The products of the invention are valuable intermediates in the synthesis of physiologically active products having an oxygenated function in the $C_{18}$ position of the steroid molecule such as, for example, aldosterone. The stages of one such synthesis producing the 18–11 lactone of Δ⁴-pregnene-11β-ol-3,20-dione-18-oic acid, a precursor of aldosterone are shown in Table I. The synthesis steps are classic in steroid chemistry and well known to those skilled in the art.

Table I

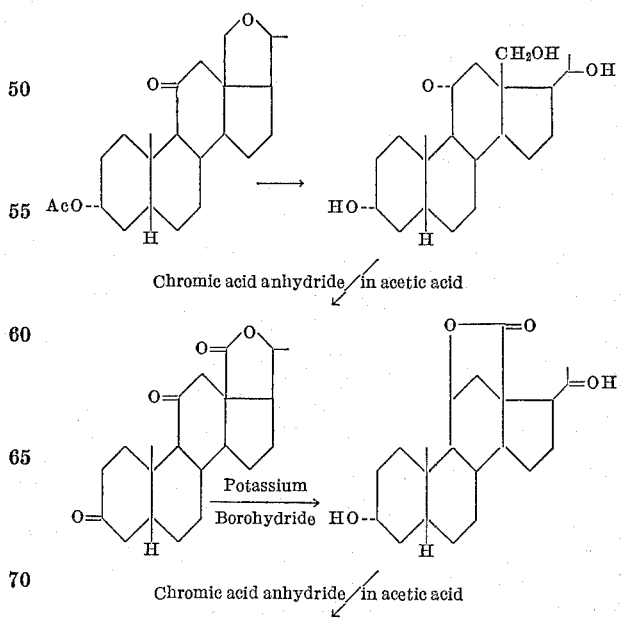

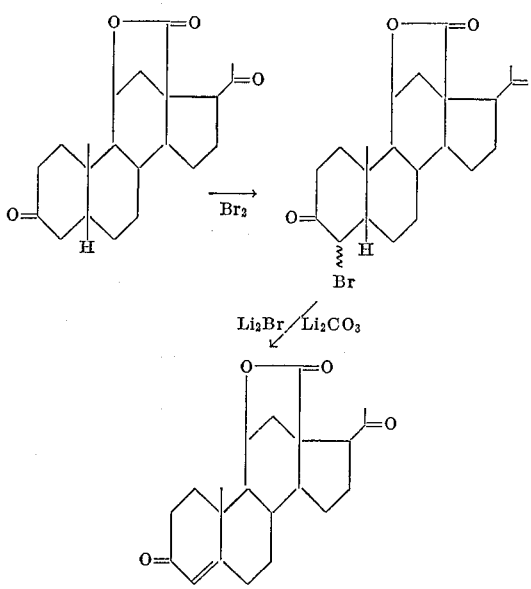

The process for the production of the products of the invention consists essentially of treating an 18,20β-oxido-5β-pregnane-11-one of the formula

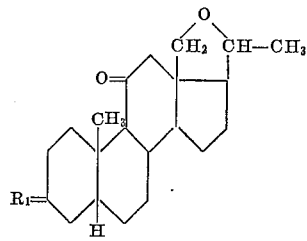

where $R_1$ is =O or

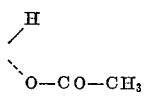

with zinc chloride in acetic acid anhydride at about room temperature, isolating the product formed thereby and treating the latter with an alkaline reagent such as refluxing with an alkali metal hydroxide in a lower alkanol, for example with potassium hydroxide in ethanol. An 18,20β-dioxygenated-5β-pregnane-11-one is obtained of the formula

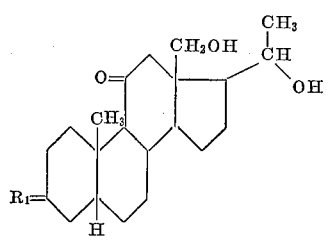

wherein $R_1$ is =O or

This latter product is acetylated according to classic methods such as heating with acetic acid anhydride in the presence of a tertiary organic base such as pyridine to obtain the diacetoxylated compound or the corresponding triacetoxylated compound. Table II is a schematic flow diagram of the reactions of the invention.

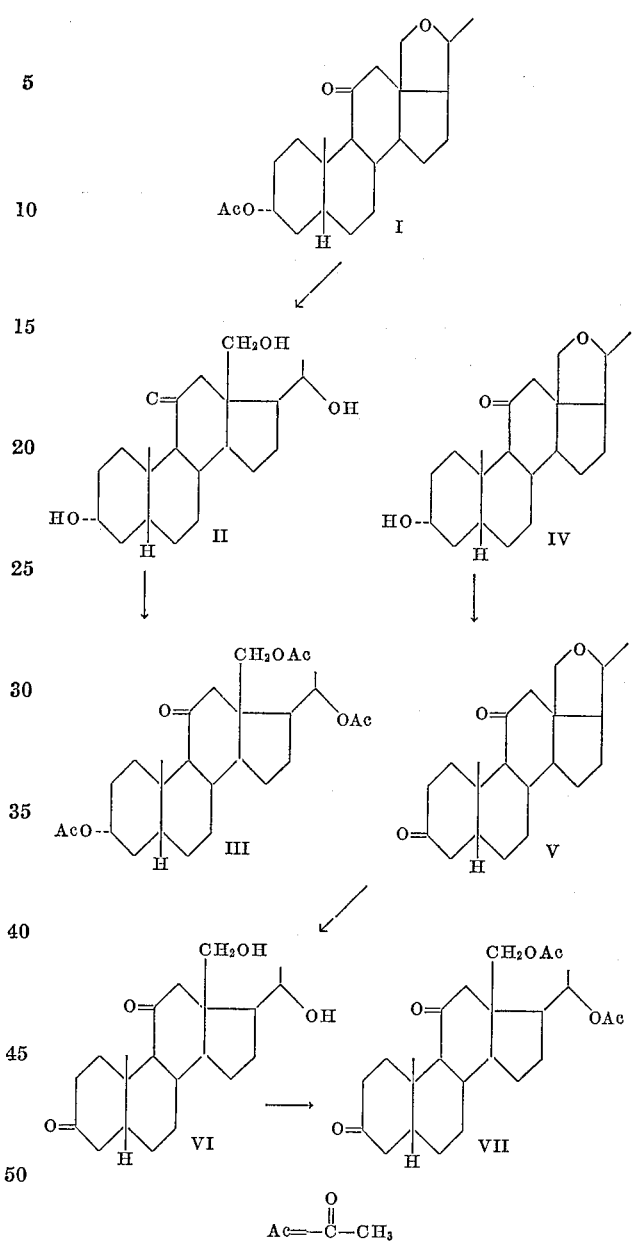

The 18,20β-oxido-5β-pregnane-3,11-dione serving as an intermediate in the preparation of the compounds of the invention is obtained by oxidation of 18,20β-oxido-5β-pregnane-3α-ol-11-one according to known processes such as chromic acid in an aqueous acidic media, preferably chromic acid in concentrated sulfuric acid, at temperatures below room temperature.

In the following examples there are described several preferred embodiments to illustrate the invention. However, it should be understood that the invention is not intended to be limited to the specific embodiments. The melting points are instantaneous melting points determined on a Kofler block.

EXAMPLE I

*Preparation of 3α-acetoxy-18,20β-oxido-5β-pregnane-11-one*

5 grams of the 3-monoacetate of 5β-pregnane-3α,20β-diol-11-one, M.P. 204° C. were introduced into 200 cc. of benzene. 10 cc. of solvent were distilled off, 10 grams of lead tetraacetate were added and the mixture was refluxed for 16 hours. It was poured into 200 cc. of water containing 10 grams of sodium iodide and solid sodium hyposulfite was added until the mixture was decolorized. The mixture was decanted and extracted with ether. The ether extracts were separated, combined, washed with water, with sodium bicarbonate, dried over magnesium sulfate and evaporated to dryness under vacuum. 6 grams of a resin were recovered which were chromatographed on 150 grams of neutral alumina. Elution was effected with petroleum ether containing 2% of methylene chloride. There was obtained 3.31 grams of a resin which on crystallization from petroleum ether furnished 1.42 grams of 3α-acetoxy-18,20β-oxido-5β-pregnane-11-one, having a melting point of 168° C. and a specific rotation $[\alpha]_D^{20}=+67°\pm5$ (CHCl$_3$). The product which has not yet been described is present in the form of small, colorless crystals, insoluble in water, soluble in alcohol, ether, acetone, benzene and chloroform, poorly soluble in petroleum ether.

*Analysis.*—C$_{23}$H$_{34}$O$_4$; molecular weight=374.50. Calculated: C, percent, 73.76; H, percent, 9.15; O, percent, 17.09. Found: C, percent, 73.8; H, percent, 9.2; O, percent, 17.5.

EXAMPLE II

*Production of 5β-pregnane-3α,18,20β-triol-11-one* (II)

25 mgm. of zinc chloride were dissolved in 0.5 cc. of acetic acid anhydride by heating and the solution was then cooled to 20° C., 100 mgm. of the acetate of 18,20β-oxido-5β-pregnane-3α-ol-11-one (I) obtained by the process of Example I was added thereto, and the mixture was allowed to stand for an hour at 20° C. The reaction mixture was poured over ice, left in contact with the ice for an hour and then extracted with methylene chloride. The combined extracts were washed with water, with sodium bicarbonate, dried over magnesium sulfate and evaporated to dryness in vacuo. The resin thus obtained was dissolved in 2 cc. of 1N alcoholic potassium hydroxide. The solution was refluxed for one hour, 20 cc. of water and ice were added thereto and the solution was extracted with methylene chloride. The combined extracts were washed with water, dried over magnesium sulfate and evaporated to dryness in vacuo. The residue was crystallized from ether to obtain 30 mgm. of 5β-pregnane-3α,18,20β-triol-11-one having a melting point of 218° C. The product is obtained in the form of small colorless platelets, insoluble in water and benzene, slightly soluble in ether and ethyl acetate, soluble in methanol and ethanol. It has not yet been described in the literature.

EXAMPLE III

*Production of 3α,18,20β-triacetoxy-5β-pregnane-11-one* (III)

0.1 gm. of 5β-pregnane-3α,18,20β-triol-11-one, obtained according to the preceding example, was heated to 55° C. for 30 minutes in 0.5 cc. of pyridine in the presence of 0.3 cc. of acetic acid anhydride. The mixture was cooled to 20° C., 5 cc. of water were added and the mixture was vacuum filtered. The filter cake was washed with water and dried at 100° C. to obtain 0.125 gm. (92% of theory) of 3α,18,20β-triacetoxy-5β-pregnane-11-one (III), having a melting point of 153° C. The product is obtained in the form of small colorless prisms, insoluble in water and petroleum ether, soluble in methylene chloride. This product is novel.

EXAMPLE IV

*Production of 18,20β-oxido-5β-pregnane-3,11-dione* (V)

1.19 gm. of 18,20β-oxido-5β-pregnane-3α-ol-11-one (IV), obtained by saponifying the 3α-acetoxy-18,20β-oxido-5β-pregnane-11-one (I) of Example I were dissolved in 15 cc. of acetone, the solution was iced and 2.07 cc. of a solution of 25 gm. of chromic acid and 37 gm. of concentrated sulfuric acid in 40 cc. of water were added at a temperature between −5° and 1° C. The mixture was agitated for 35 minutes and 1 cc. methanol was added. The mixture was agitated again for 5 minutes, poured into water and vacuum filtered. The filter cake was washed with water and dried at 90° C. 1.1 gm. (95% of theory) of 18,20β-oxido-5β-pregnane-3,11-dione, V, having a melting point of 176° C. and a specific rotation $[\alpha]_D^{20}=+57°\pm2$ (c.=0.5% in chloroform), was obtained.

This product, which is novel, is obtained in the form of small colorless crystals, insoluble in water, slightly soluble in ether, soluble in acetone and chloroform.

EXAMPLE V

*Production of 5β-pregnane-18,20β-diol-3,11-dione* (VI)

1.2 gm. of 18,20β-oxido-5β-pregnane-3,11-dione, obtained according to the preceding example, was treated according to the process indicated in Example II and 5β-pregnane-18,20β-diol-3,11-dione was obtained with a yield of 30%. This product, which has not yet been described, is obtained in the form of small colorless crystals, insoluble in water, slightly soluble in ether, soluble in chloroform and having a melting point of 204° C.

EXAMPLE VI

*Production of 18,20β-diacetoxy-5β-pregnane-3,11-dione* (VII)

0.2 gm. of 5β-pregnane-18,20β-diol-3,11-dione (VI), obtained according to the preceding example were heated to 60° C. for 30 minutes in 1 cc. of pyridine in the presence of 0.7 cc. of acetic acid anhydride. The mixture was cooled to 20° C., 10 cc. of water are added thereto and it was vacuum filtered. The filter cake was washed with water and dried at 90° C. 0.260 gm. (95% of theory) of 18,20β-diacetoxy-5β-pregnane-3,11-dione, VII, were obtained. The product is novel.

Various modifications of the process may be made without departing from the spirit or scope thereof, and it is to be understood that the invention be limited only as defined in the appended claim.

I claim:

A compound having the formula

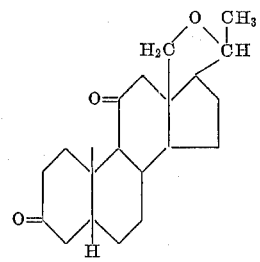

References Cited by the Examiner

Fieser et al., Natural Products Related to Phenanthrene (third edition) (1949), pp. 428, 220, 232 and 451.

Heusler et al., Experientia 16, 21—24 (January 1960).

LEWIS GOTTS, *Primary Examiner.*

LESLIE H. GASTON, MORRIS LIEBMAN, *Examiners.*

M. L. WILLIAMS, H. FRENCH, *Assistant Examiners.*